United States Patent
Chen

(10) Patent No.: US 6,935,604 B2
(45) Date of Patent: Aug. 30, 2005

(54) MOUNTING APPARATUS FOR STORAGE DEVICES

(75) Inventor: Yun Lung Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/857,694

(22) Filed: May 28, 2004

(65) Prior Publication Data

US 2004/0238717 A1 Dec. 2, 2004

(30) Foreign Application Priority Data

May 28, 2003 (TW) ........................ 92209839 U

(51) Int. Cl.[7] ................................................ H05K 7/12
(52) U.S. Cl. .................. 248/694; 312/223.2; 361/685; 361/726; 361/727
(58) Field of Search .......................... 248/694; 361/684, 361/685, 726, 727; 312/223.2

(56) References Cited

U.S. PATENT DOCUMENTS

| | | | |
|---|---|---|---|
| 6,543,866 B2 * | 4/2003 | Chen et al. ............. | 312/223.2 |
| 6,654,253 B1 * | 11/2003 | DiMarco .................. | 361/730 |
| 6,698,853 B2 * | 3/2004 | Chen et al. ............... | 312/263 |
| 6,728,109 B1 * | 4/2004 | Wu ......................... | 361/747 |
| 2002/0101708 A1 * | 8/2002 | Cheng .................... | 361/685 |

FOREIGN PATENT DOCUMENTS

| | | | | |
|---|---|---|---|---|
| JP | 2163811 A | * | 6/1990 | ............ 361/685 |
| TW | 146513 | | 11/1990 | |
| TW | 190919 | | 9/1992 | |

* cited by examiner

Primary Examiner—Jonathon Szumny
(74) Attorney, Agent, or Firm—Wei Te Chung

(57) ABSTRACT

A storage device mounting apparatuses includes a bracket (20), a plurality of retaining member (50) attached to a first plate (26) of the bracket, and a pair of knobs (60). A pair of pivot holes (26) is defined in the top plate for engagingly receiving the knobs. The knob includes a convex portion (65) and a concave portion (66). The retaining member includes a cantilever portion (52) and a resilient strip (53). A pair of legs (54) depends from the strip. The knob rotates between a first position in which the convex portion abut against the cantilever portion and the strip is upward moved to release the legs from the corresponding locating holes and a second position in which the concave portion faces the cantilever portion and the strip is in its original state and the legs engage in corresponding locating holes of the storage device.

20 Claims, 6 Drawing Sheets

MOUNTING APPARATUS FOR STORAGE DEVICES

BACKGROUND OF THE INVENTION

1. Field of the Invention

The present invention relates to mounting apparatuses for securing items such as data storage devices, and more particularly to a mounting apparatus which can conveniently and readily mount data storage devices in a chassis.

2. Related Art

A typical personal computer invariably comprises one or more data storage devices for communication and handling of data. Such storage devices include, but are not limited to, hard disk drives, floppy disk drives and CD-ROM drives. Users of computers and technicians alike require that a drive bracket of an enclosure of the computer allows them to easily secure storage devices such as disk drives. Conventionally, each disk drive comprises a rigid casing that is retained in the enclosure by means of bolts or rivets. However, insertion and removal of screws is time consuming and cumbersome.

As computers have proliferated and improved, various devices have been developed to facilitate installation and removal of disk drives. One such device comprises two flat rectangular side pieces which are attached to opposite sides of the disk drive. Corresponding receiving rails provided in a drive bracket cooperatively receive the side pieces in sliding engagement. When the disc drive is fully received in the bracket, a screw is tightened so that the screw presses against one of the side pieces or the disk drive itself. However, this device does not altogether eliminate the need for using screws.

An improved data storage device mounting means which overcomes these problems is desired.

SUMMARY OF THE INVENTION

Accordingly, a main object of the present invention is to provide a mounting apparatus for simply and easily mounting a storage device in a chassis.

To achieve the above object, a mounting apparatus for storage device includes a bracket, four retaining members attached to a first plate of the bracket, and a pair of knobs. A pair of pivot holes is defined in the top plate for engagingly receiving the knobs. The knob includes a convex portion and a concave portion. The retaining member includes a cantilever portion and a resilient portion. A pair of legs depends from the strip. The knob rotates between a first position in which the convex portion abut against the cantilever portion and the strip is upward moved to release the legs from the corresponding locating holes and a second position in which the concave portion faces the cantilever portion and the strip is in its original state and the legs engage in corresponding locating holes of the storage device.

Other objects, advantages and novel features of the present invention will be drawn from the following detailed description of a preferred embodiment of the present invention with the attached drawings, in which:

DESCRIPTION OF THE PREFERRED EMBODIMENT

Figure 1:
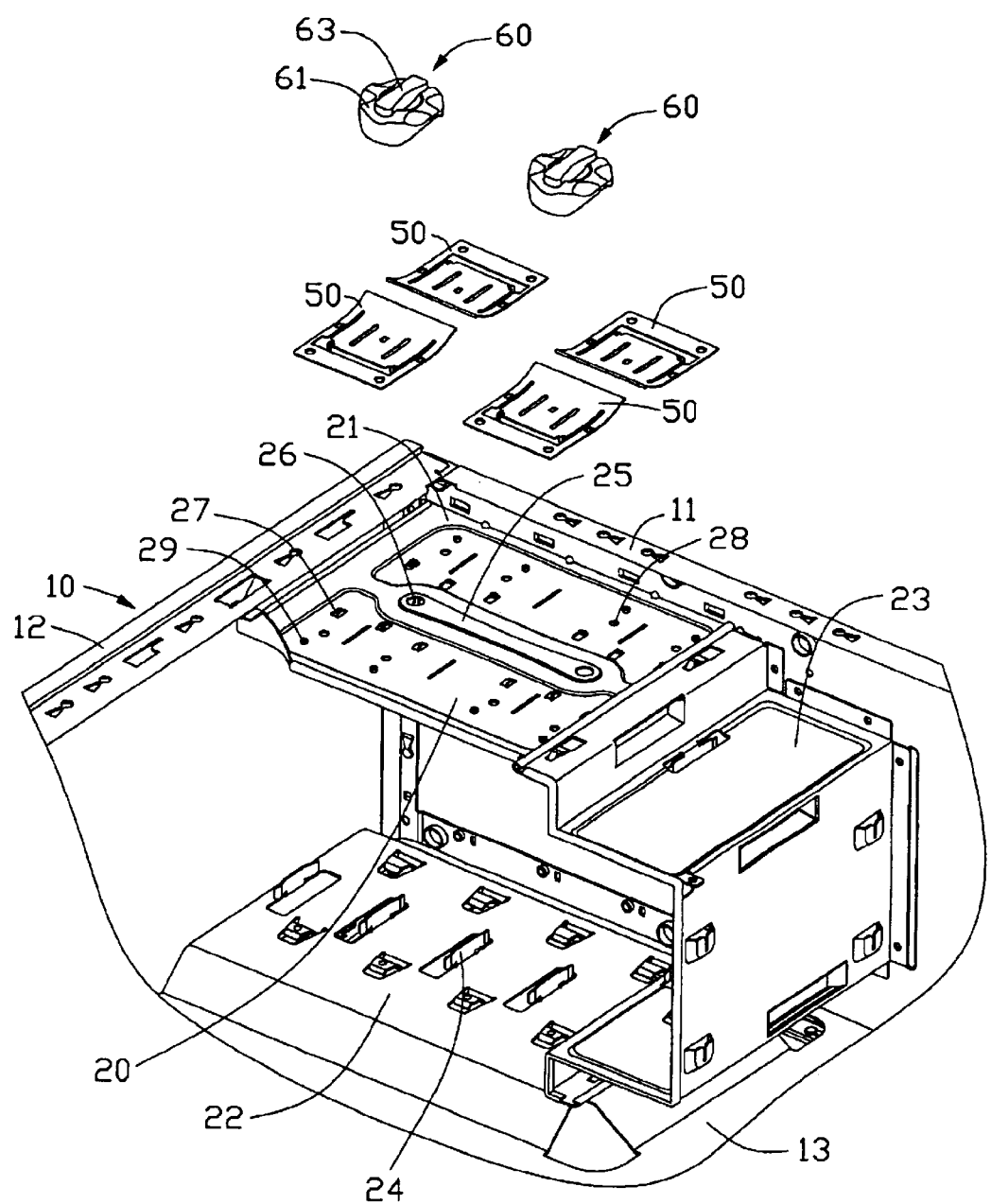
FIG. 1 is an exploded, isometric view of a chassis incorporating a mounting apparatus for storage devices in accordance with the present invention.
Figure 6:
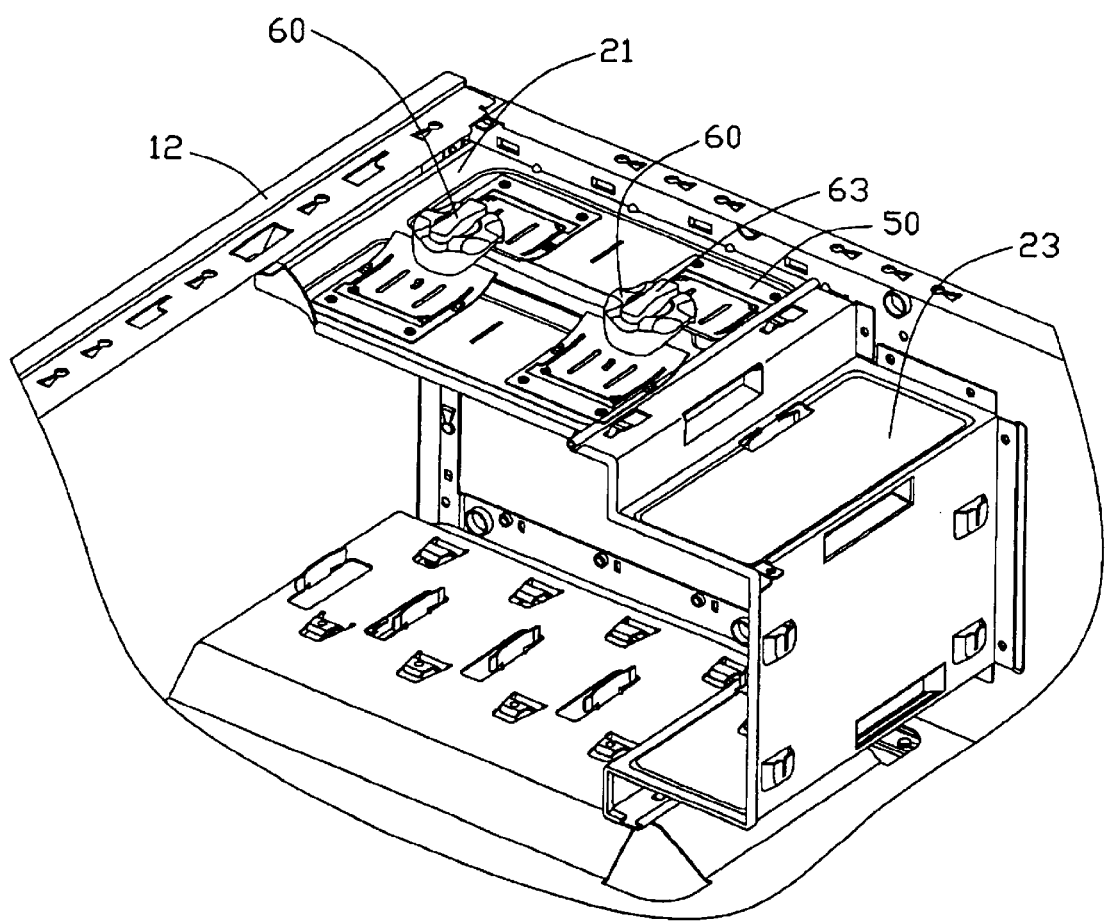
FIG. 6 is similar to FIG. 5, but showing the knobs in released positions and not showing the storage devices.

Referring to FIGS. 1 and 6, a mounting apparatus for storage devices in accordance with the present invention comprises a bracket 20, four retaining members 50, and a pair of knobs 60. The bracket 20 is installed in a chassis 10 of an electronic apparatus such as a personal computer. The bracket 20 is provided for housing a plurality of storage devices 90 such as hard disk drives therein. Each knob 60 is for engaging a pair of retaining members 50, in order to secure at least one storage device 90 in the bracket 20.

The chassis 10 comprises a front panel 11, a side panel 12, and a bottom panel 13.

The bracket 20 is attached to the side panel 12, the bottom panel 13 and the front panel 11 of the chassis 10. The bracket 20 comprises an upper plate 21, a lower plate 22, and a side plate 23. The combined bracket 20 and chassis 10 defines a space for accommodating the storage devices 90. A plurality of spaced bars 24 extends perpendicularly from each of the upper and lower plates 21, 22. Any two adjacent pairs of bars 24 define a recess for a respective storage device 90 to be received thereat. A raised portion 25 protrudes upwardly from the upper plate 21. A pair of spaced pivot holes 26 is defined in the raised portion 25, for fixing the knobs 60 therein. A plurality of hooks 27 is formed on the upper plate 21 at each of the opposite sides of the raised portion 25. A plurality of through holes 28 is defined in the upper plate 21 at each of opposite sides of the raised portion 25, the through holes 28 at each of said sides being more distal from the raised portion 25 than the corresponding hooks 27. A plurality of pins 29 is formed on the upper plate 21 at each of opposite sides of the raised portion 25, the pins 29 at each of said sides being more distal from the raised portion 25 than the corresponding through holes 28.

Each storage device 90 defines a pair of locating holes (not shown) in a top side thereof.

Figure 2:
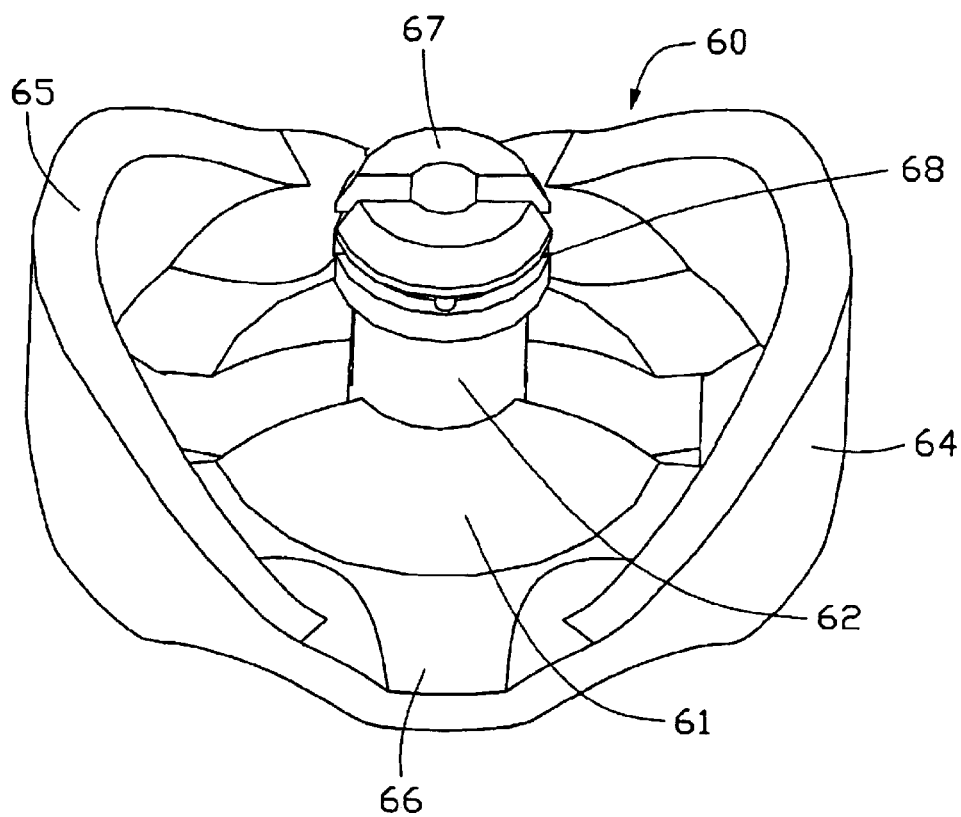
FIG. 2 is an enlarged, isometric view of one of two knobs of the mounting apparatus of FIG. 1, but showing the knob inverted.

Referring also to FIG. 2. each knob 60 comprises a top 61 and a shaft 62 depending from the top 61 and pivotably engaging in a corresponding pivot hole 26 of the bracket 20. A block 63 is formed on the top 61, for convenient operation of the knob 60 by a user. A pair of arcuate flanges 64 depends from opposite circumferential edge portions of the top 61 respectively, thereby defining a pair of opposite convex portions 65 and a pair of opposite concave portions 66 between the convex portions 65. A tapped gasket portion 67 is formed on a distal end of the shaft 62. An annular groove 68 is defined in an outer circumferential part of the gasket portion 67. A distance between the groove 68 and a distal end of the gasket portion 67 is less than a height of the raised portion 25 above the upper plate 21 of the bracket 20. portion 67 is less than a height of the raised portion 25 above the upper plate 21 of the bracket 20.

Figure 3:
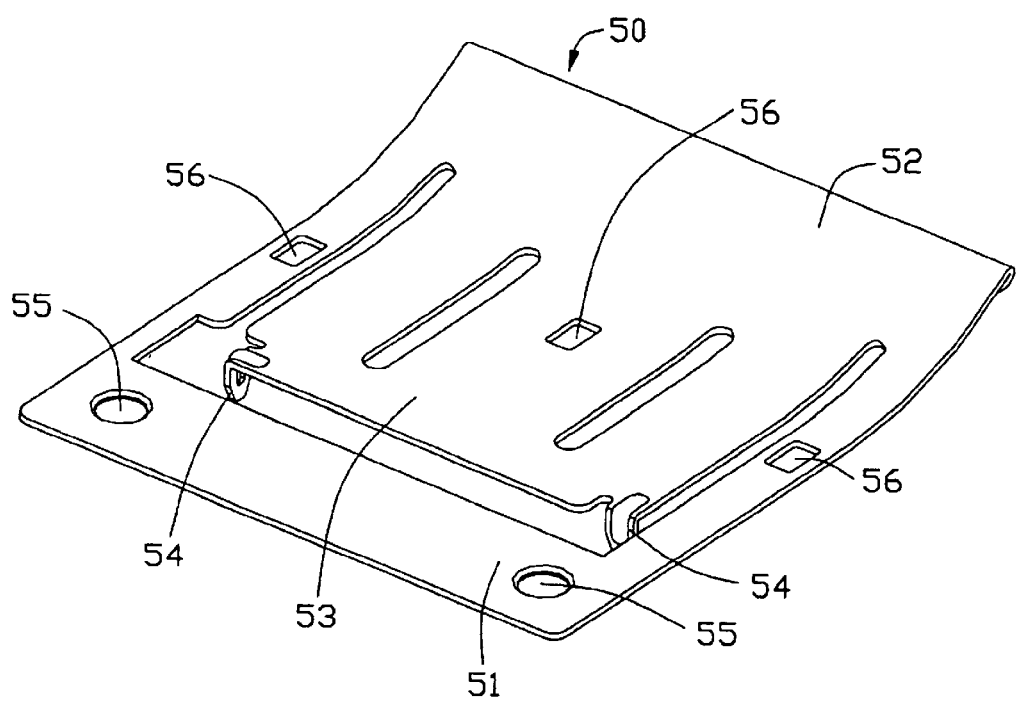
FIG. 3 is an enlarged, isometric view of one of four retaining members of the mounting apparatus of FIG. 1.
Figure 4:
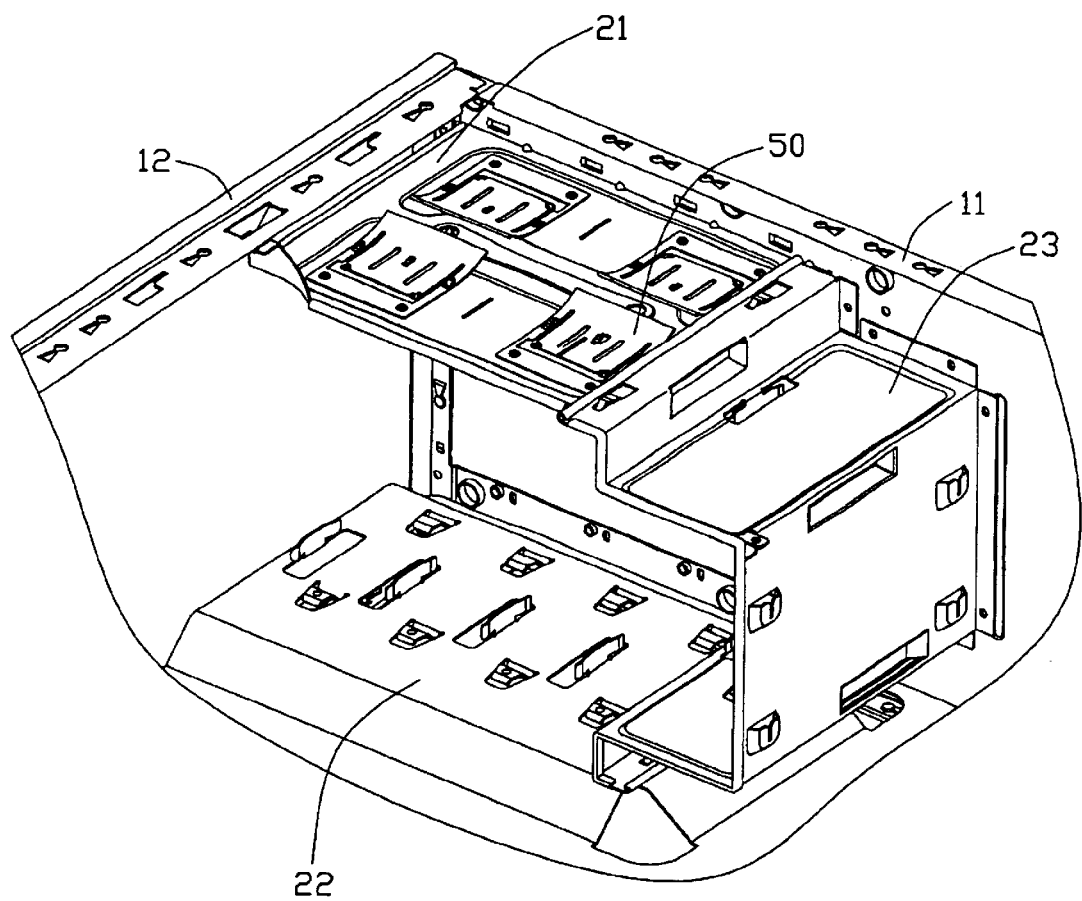
FIG. 4 is a partially assembled view of FIG. 1, but not showing the knobs.

Referring to FIG. 3, each retaining member 50 comprises an edge portion 51, and a cantilever portion 52 extending arcuately upwardly from the edge portion 51. A resilient strip 53 is formed in a middle of the retaining member 50 by punching. A curvature of the strip 53 is the same as that of corresponding adjacent parts of the cantilever portion 52. A pair of legs 54 depends from free corners of the strip 53 respectively, adjacent the edge portion 51. The edge portion 51 defines a pair of spaced securing holes 55 therein, for receiving corresponding pins 29 of the bracket 20. A plurality of slots 56 is defined in the cantilever portion 52, for engagingly receiving corresponding hooks 27 of the bracket 20.

Referring to FIGS. 1 through 6, in assembly, the retaining members 50 are attached to the upper plate 21 of the bracket 20. The corresponding pins 29 of the bracket 20 extend through the securing holes 55 of each retaining member 50. The corresponding hooks 27 of the bracket 20 engage in the slots 56 of each retaining member 50. The legs 54 of each retaining member 50 extend through corresponding through holes 28 of the bracket 20. The legs 54 can thus engage in the locating holes of two corresponding storage devices 90, in order to locate the storage devices 90 in the bracket 20. The pins 29 are punched so that the edge portions 51 of each retaining member 50 are fixed to the upper plate 21. The knobs 60 are then attached to the bracket 20. The gasket portion 67 of each knob 60 is pressed into a corresponding pivot hole 26 of the bracket 20, with the groove 68 engagingly receiving a corresponding circular edge portion of the raised portion 25 at the pivot hole 26. When each knob 60 is rotated relative to the bracket 20, the convex portions 65 and concave portions 66 of the knob 60 can separately contact the respective cantilever portions 52 of the corresponding retaining members 50.

Figure 5:
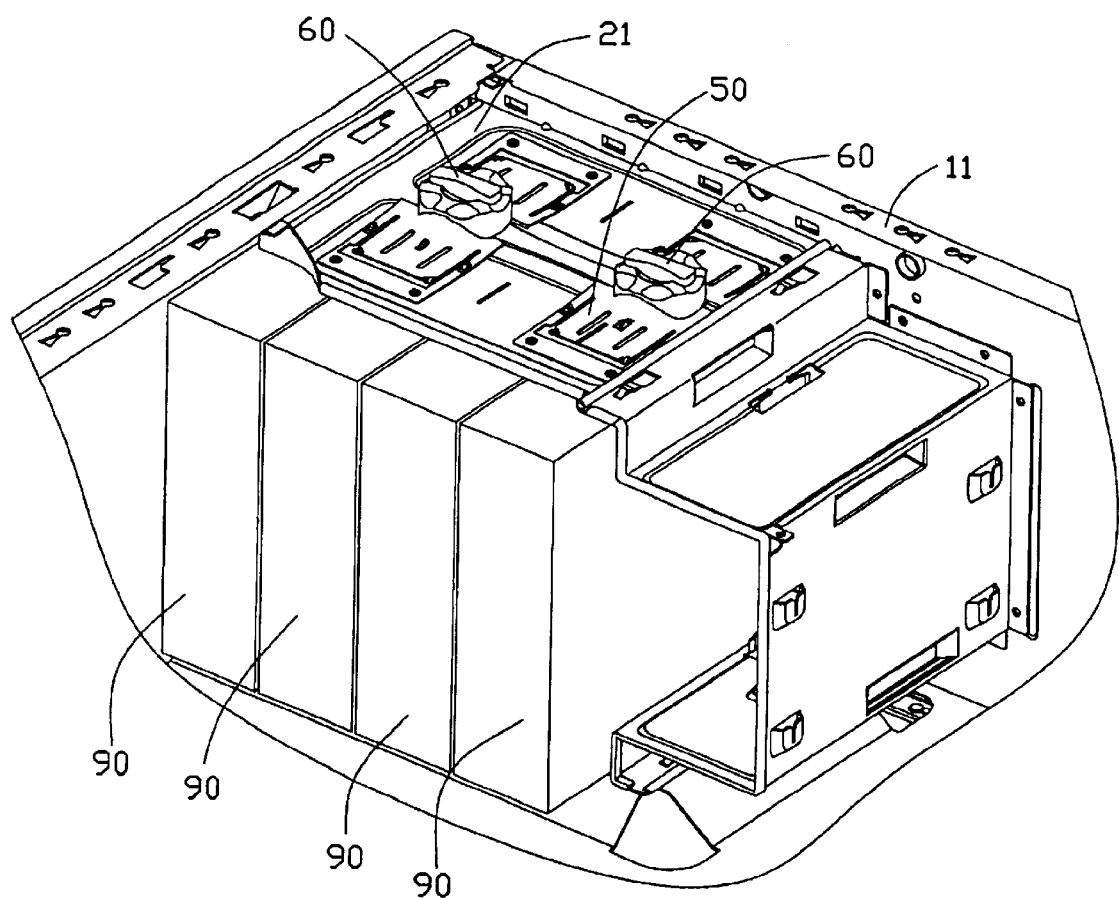
FIG. 5 is a fully assembled view of FIG. 1, showing a plurality of storage devices secured in the chassis.

When each knob 60 is rotated to a first position, the convex portions 65 of the knob 60 press down on the cantilever portions 52 of the corresponding retaining members 50 (see FIG. 5). Accordingly, edges of the resilient strip 53 between the legs 54 of the retaining member 50 are raised, and the legs 54 are raised upwardly and out from the locating holes of the corresponding storage devices 90. The storage devices 90 can then be easily slid out from said space of the combined bracket 20 and chassis 10. When the knob 60 is rotated to a second position, the convex portions 65 rotate away from the cantilever portions 52 of the retaining members 50, and the concave portions 66 come into contact with the cantilever portions 52 (see FIG. 6). Accordingly, the edges of the resilient strips 53 rebound downwardly, and the legs 54 extend into the locating holes of the storage devices 90. The storage devices 90 are thus secured in said space. The mounting apparatus according to the present invention can simply and easily secure and release the storage devices 90.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to full extent indicated by the broad general meaning of the terms in which the appended claims are expressed.

What is claimed is:

1. A mounting apparatus for mounting at least one storage device in a chassis, the at least one storage device defining at least one locating hole in a side thereof, the mounting apparatus comprising:
    a bracket adapted for accommodating the storage device, the bracket comprising a first plate defining a pivot hole and a pair of through holes on opposite sides of the pivot hole;
    a pair of retaining members attached to the first plate of the bracket, each of the retaining members comprising a cantilever portion and a resilient portion, a leg depending from the resilient portion for engaging in the at least one locating hole of the at least one storage device; and
    a knob comprising a shaft, a convex portion and a concave portion, the shaft pivotally engaging in the pivot hole of the bracket;
    wherein the knob is rotatable between a first position in which the convex portion presses the cantilever portion and the leg of the resilient portion is raised free for disengaging from the at least one locating hole, and a second position in which the concave portion faces the cantilever portion and the leg of the resilient portion extends through the through holes for engaging in the at least one locating hole.

2. The mounting apparatus as described in claim 1, wherein the bracket comprises a second plate opposite to the first plate, a plurality of bars is formed from the first and second plates, and any two adjacent bars define a recess therebetween for receiving the at least one storage device thereat.

3. The mounting apparatus as described in claim 1, wherein the first plate of the bracket comprises a raised portion in which the pivot hole is defined.

4. The mounting apparatus as described in claim 3, wherein the bracket comprises a plurality of pins at one side of the raised portion, the cantilever portion comprises an edge portion, and the edge portion defines a plurality of holes engagingly receiving the pins.

5. The mounting apparatus as described in claim 1, wherein the resilient portion is formed in a middle portion of the retaining member by punching, and a curvature of the resilient portion is substantially the same as that of corresponding adjacent parts of the cantilever portion.

6. The mounting apparatus as described in claim 5, wherein the cantilever portion defines a plurality of cutouts, and the bracket forms a plurality of hooks engaging in the cutouts.

7. The mounting apparatus as described in claim 1, wherein the knob comprises a top, the convex portion depends from a circumferential edge portion of the top, and the concave portion is defined adjacent the convex portion.

8. The mounting apparatus as described in claim 7, wherein the shaft forms a gasket portion on a distal end thereof, and an outer circumferential part of the gasket portion defines an annular groove.

9. A mounting apparatus assembly comprising:
    a chassis comprising a bottom plate;
    a storage device accommodated in the chassis, the storage device defining at least a locating hole;
    a bracket attached in the chassis and adapted for securing the storage device in the chassis, the bracket comprising a first plate parallel to and spaced from the bottom plate;
    at least a retaining member attached to the first plate, the retaining member comprising a cantilever portion and at least a leg depending from the cantilever portion;
    at least a knob pivotably attached to the first plate, the knob comprising a convex portion and a concave portion; and
    securing means for attaching the retaining member to the first plate;
    wherein the knob is rotatable between an engaging position and a disengaging position, in which the concave portion and the convex portion are respectively engaged with the cantilever portion, and in which the leg of the retaining member is respectively engaged in and free from the locating hole of the storage device.

10. The mounting apparatus assembly as described in claim 9, wherein the bracket comprises a second plate attached to the bottom plate, a plurality of bars is formed from the first and second plates, and any two adjacent bars define a recess therebetween for receiving the storage device thereat.

11. The mounting apparatus assembly as described in claim 10, wherein the bracket comprises a plurality of pins formed on the first plate at one side of the raised portion, the cantilever portion comprises an edge portion, and the edge portion defines a plurality of holes engagingly receiving the pins.

12. The mounting apparatus assembly as described in claim 11, wherein the bracket defines at least a hole adjacent the pins corresponding to the at least a locating hole of the storage device, for extension of the at least a leg of the retaining member therethrough.

13. The mounting apparatus assembly as described in claim 9, wherein a resilient portion is formed in a middle portion of the retaining member, and a curvature of the resilient portion is substantially the same as that of corresponding adjacent parts of the cantilever portion.

14. The mounting apparatus assembly as described in claim 13, wherein the securing means comprises a plurality of slots defined in the cantilever portion, and a plurality of hooks formed on the first plate engaging in the slots.

15. The mounting apparatus assembly as described in claim 9, wherein the knob comprises a shaft, and the first plate defines a pivot hole pivotably receiving the shaft therein.

16. The mounting apparatus assembly as described in claim 15, wherein the knob further comprises a top, the convex portion depends from a circumferential edge portion of the top, and the concave portion is defined adjacent the convex portion.

17. The mounting apparatus assembly as described in claim 15, wherein the shaft defines a groove engagingly receiving an edge of the first plate at the pivot hole.

18. A mounting apparatus assembly comprising:
a chassis comprising a bottom plate;
a storage device accommodated in the chassis, the storage device defining at least a locating hole;
a bracket attached in the chassis and adapted for securing the storage device in the chassis, the bracket comprising a plate parallel to and spaced from the bottom plate;
at least a retaining member attached to the plate and defining a leg thereof;
at least a knob pivotably attached to the plate, and
wherein the knob is rotatable between an engaging position and a disengaging position, in which the leg of the retaining member is respectively engaged in and free from the locating hole of the storage device; wherein
a pivot axis of said knob is perpendicular to the plate.

19. The mounting apparatus assembly as described in claim 18, wherein the knob comprises a convex portion for driving the free portion to disengage the leg from the locating hole of the storage device.

20. The mounting apparatus assembly as described in claim 19, wherein the retaining member defines a cantilever portion which engages with the convex portion.

* * * * *